(12) United States Patent
Jani

(10) Patent No.: US 9,060,526 B2
(45) Date of Patent: *Jun. 23, 2015

(54) CONFECTIONERY PROCESSING

(75) Inventor: Bharat Jani, East Brunswick, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/145,387

(22) PCT Filed: Jan. 22, 2010

(86) PCT No.: PCT/US2010/021768
§ 371 (c)(1),
(2), (4) Date: Jul. 20, 2011

(87) PCT Pub. No.: WO2010/085623
PCT Pub. Date: Jul. 29, 2010

(65) Prior Publication Data
US 2011/0268837 A1 Nov. 3, 2011

Related U.S. Application Data

(60) Provisional application No. 61/146,351, filed on Jan. 22, 2009.

(51) Int. Cl.
*A23G 3/54* (2006.01)
*A23G 3/34* (2006.01)
(Continued)

(52) U.S. Cl.
CPC .............. *A23G 3/001* (2013.01); *A23G 3/0021* (2013.01); *A23G 3/004* (2013.01); *A23G 3/0068* (2013.01); *A23G 3/54* (2013.01); *A23G 4/043* (2013.01); *A23G 4/20* (2013.01)

(58) Field of Classification Search
CPC .................................. A23G 4/20; A23G 3/54
USPC ..................................... 426/3, 4, 5, 6
See application file for complete search history.

(56) References Cited

U.S. PATENT DOCUMENTS

| 146,541 A | 1/1874 | Moore |
| 193,045 A | 7/1877 | Sibley et al. |
| 280,115 A | 6/1883 | Aubin |

(Continued)

FOREIGN PATENT DOCUMENTS

| EP | 0624318 B1 | 12/1997 |
| EP | 0762834 B1 | 2/1999 |

(Continued)

OTHER PUBLICATIONS

IPRP, PCT/US2010/021768, Date of Mailing Aug. 4, 2011.

(Continued)

*Primary Examiner* — Nikki H Dees
(74) *Attorney, Agent, or Firm* — Cantor Colburn LLP

(57) ABSTRACT

The present invention provides various methods of improving homogeneity in confectionery mixing processes. In particular, the invention includes such steps as mixing a predetermined amount of confectionery base and/or chewing gum base and bulk sweeteners in a first direction for a first cycle period to provide a mixture; adding a predetermined amount of a flavoring component to the mixture; mixing the mixture in a second direction for a second cycle period; mixing the mixture in the first direction for a third cycle period.

8 Claims, 3 Drawing Sheets

Multi-Layered Gum/Candy Formation Process

(51) Int. Cl.
　　*A23G 4/04*　　　(2006.01)
　　*A23G 4/20*　　　(2006.01)

(56) References Cited

U.S. PATENT DOCUMENTS

| | | |
|---|---|---|
| D14,842 S | 3/1884 | Griscom, Jr. |
| 462,990 A | 11/1891 | Oppenheimer |
| 692,323 A | 2/1902 | Marine |
| 1,242,562 A | 10/1917 | Laskey |
| 1,267,320 A | 5/1918 | Fries |
| 1,886,763 A | 4/1930 | Trettin |
| 1,771,506 A | 7/1930 | Mustin |
| 1,771,981 A | 7/1930 | Mustin |
| 1,771,982 A | 7/1930 | Mustin |
| 1,855,145 A | 4/1932 | Jones |
| 2,060,490 A | 5/1933 | Borbely |
| 2,039,398 A | 10/1934 | Dye |
| 2,215,575 A | 9/1940 | Bowman |
| 2,460,698 A | 2/1949 | Lindhe |
| 2,613,185 A | 3/1951 | Marshall |
| 2,559,648 A | 7/1951 | Lindhe |
| 2,604,056 A | 7/1952 | Mahle |
| 2,685,517 A | 8/1954 | Dunmire |
| 2,973,273 A | 2/1961 | Curtiss |
| 3,062,662 A | 11/1962 | McDonald |
| 3,156,195 A | 11/1964 | Evanson et al. |
| 3,208,405 A | 9/1965 | Beer |
| 3,303,796 A | 2/1967 | Novissimo |
| 3,410,230 A | 11/1968 | Rossi |
| 3,477,394 A | 11/1969 | Tidwell |
| 3,492,131 A | 1/1970 | Schlatter |
| 3,549,389 A | 12/1970 | Peterson |
| 3,857,965 A | 12/1974 | Ream |
| 3,865,957 A | 2/1975 | Schieweck et al. |
| 3,908,032 A | 9/1975 | Didelot et al. |
| 3,912,817 A | 10/1975 | Sapsowitz |
| 4,032,661 A | 6/1977 | Rowsell et al. |
| 4,097,616 A | 6/1978 | Guillou et al. |
| 4,136,163 A | 1/1979 | Watson et al. |
| 4,150,161 A | 4/1979 | Rudolph et al. |
| 4,178,459 A | 12/1979 | Watson et al. |
| 4,224,345 A | 9/1980 | Tezuka et al. |
| 4,230,688 A | 10/1980 | Rowsell et al. |
| 4,238,510 A | 12/1980 | Cherukuri et al. |
| 4,254,149 A | 3/1981 | Rudolph et al. |
| 4,260,635 A | 4/1981 | Fisher |
| 4,271,197 A | 6/1981 | Hopkins et al. |
| 4,271,199 A | 6/1981 | Cherukuri et al. |
| 4,279,931 A | 7/1981 | Verwaerde et al. |
| 4,292,337 A | 9/1981 | Andersen |
| 4,296,255 A | 10/1981 | Roswell et al. |
| 4,323,588 A | 4/1982 | Vink et al. |
| 4,346,116 A | 8/1982 | Verwaerde et al. |
| 4,352,823 A | 10/1982 | Cherukuri et al. |
| 4,352,824 A | 10/1982 | Puglia et al. |
| 4,352,825 A | 10/1982 | Cherukuri et al. |
| 4,399,154 A | 8/1983 | Puglia et al. |
| D271,344 S | 11/1983 | Faust |
| D271,534 S | 11/1983 | Huzinec |
| D271,535 S | 11/1983 | Huzinec |
| 4,459,425 A | 7/1984 | Amano et al. |
| 4,491,596 A | 1/1985 | Elias |
| 4,496,592 A | 1/1985 | Kuwahara et al. |
| 4,601,907 A | 7/1986 | Knebl et al. |
| 4,614,654 A | 9/1986 | Ream et al. |
| 4,619,834 A | 10/1986 | Zanno et al. |
| 4,671,961 A | 6/1987 | Patel et al. |
| 4,707,363 A | 11/1987 | Sato et al. |
| 4,714,620 A | 12/1987 | Bunick et al. |
| 4,741,905 A | 5/1988 | Huzinec |
| 4,753,806 A | 6/1988 | Carroll et al. |
| 4,781,929 A | 11/1988 | Hoashi |
| 4,822,621 A | 4/1989 | Glass et al. |
| 4,822,622 A * | 4/1989 | Dokuzovic et al. .............. 426/5 |
| 4,822,628 A | 4/1989 | Huc |
| 4,847,090 A * | 7/1989 | Della Posta et al. .......... 424/440 |
| 4,889,729 A | 12/1989 | Aujourd'hui |
| 4,911,937 A | 3/1990 | Crosello et al. |
| 4,938,128 A | 7/1990 | Knebl |
| 4,971,806 A | 11/1990 | Cherukuri et al. |
| 5,009,893 A | 4/1991 | Cherukuri et al. |
| 5,017,385 A | 5/1991 | Wienecke |
| 5,091,198 A | 2/1992 | Hoashi |
| 5,135,760 A | 8/1992 | Degady et al. |
| 5,147,675 A | 9/1992 | Gage et al. |
| 5,206,042 A | 4/1993 | Dave et al. |
| 5,266,592 A | 11/1993 | Grub et al. |
| 5,314,701 A | 5/1994 | Mentink et al. |
| 5,397,580 A | 3/1995 | Song et al. |
| 5,407,665 A | 4/1995 | McLaughlin et al. |
| 5,419,093 A | 5/1995 | Wei |
| 5,437,879 A * | 8/1995 | Kabse et al. ....................... 426/5 |
| 5,462,760 A | 10/1995 | Serpelloni et al. |
| 5,470,591 A | 11/1995 | Ribadeau-Dumas et al. |
| 5,480,308 A | 1/1996 | Boundy |
| 5,538,741 A | 7/1996 | Richey et al. |
| 5,538,742 A | 7/1996 | McHale et al. |
| 5,545,424 A | 8/1996 | Nakatsu et al. |
| 5,567,467 A | 10/1996 | Kondou et al. |
| 5,580,601 A | 12/1996 | Ribadeau-Dumas et al. |
| 5,637,313 A | 6/1997 | Chau et al. |
| 5,679,397 A | 10/1997 | Kuroda et al. |
| 5,698,181 A | 12/1997 | Luo |
| 5,712,030 A | 1/1998 | Goto et al. |
| 5,714,157 A | 2/1998 | Sandell et al. |
| 5,834,044 A | 11/1998 | Schmitz et al. |
| 5,879,728 A | 3/1999 | Graff et al. |
| 5,900,261 A | 5/1999 | Ribadeau-Dumas et al. |
| 5,955,116 A | 9/1999 | Kehoe et al. |
| 5,958,471 A | 9/1999 | Schwarz et al. |
| 5,958,472 A | 9/1999 | Robinson et al. |
| 6,056,988 A | 5/2000 | Bangerter et al. |
| 6,060,078 A | 5/2000 | Lee |
| D426,935 S | 6/2000 | Zaug et al. |
| D430,347 S | 8/2000 | van der Hagen |
| D431,342 S | 10/2000 | Wright et al. |
| D433,083 S | 10/2000 | Griffith |
| 6,159,509 A | 12/2000 | Johnson et al. |
| 6,165,521 A | 12/2000 | Mayfield |
| 6,180,143 B1 | 1/2001 | Rapp et al. |
| 6,277,385 B1 | 8/2001 | Luke |
| 6,294,200 B1 | 9/2001 | Conte et al. |
| 6,372,271 B1 | 4/2002 | Fritzsching et al. |
| 6,417,346 B1 | 7/2002 | Salome et al. |
| 6,444,240 B1 | 9/2002 | Barkalow et al. |
| 6,555,146 B1 | 4/2003 | Rapp et al. |
| 6,562,392 B1 | 5/2003 | Rapp et al. |
| 6,592,884 B2 | 7/2003 | Hofmann et al. |
| 6,623,266 B2 | 9/2003 | Jani et al. |
| 6,627,233 B1 | 9/2003 | Wolf et al. |
| 6,759,069 B2 | 7/2004 | Gray |
| 6,780,443 B1 | 8/2004 | Nakatsu et al. |
| 6,783,779 B2 | 8/2004 | Rapp et al. |
| 6,805,890 B2 * | 10/2004 | Wu et al. ....................... 426/103 |
| 6,860,089 B2 * | 3/2005 | VanAlstine ..................... 53/466 |
| 6,890,582 B2 | 5/2005 | Parady |
| 7,030,273 B1 | 4/2006 | Sun |
| 7,049,299 B2 | 5/2006 | Francois |
| 7,112,345 B1 | 9/2006 | McHale et al. |
| 7,189,760 B2 | 3/2007 | Erman et al. |
| 7,300,679 B1 | 11/2007 | Robinson et al. |
| 7,438,939 B2 | 10/2008 | McCarrick |
| D616,177 S | 5/2010 | Brown et al. |
| D161,423 S | 5/2012 | Claflin |
| 2002/0113632 A1 | 8/2002 | Yatka et al. |
| 2002/0136812 A1 | 9/2002 | Degady et al. |
| 2002/0142059 A1 | 10/2002 | Jani et al. |
| 2003/0026826 A1 | 2/2003 | Cherukuri et al. |
| 2003/0129281 A1 | 7/2003 | Murray et al. |
| 2003/0134012 A1 | 7/2003 | Mederer |
| 2004/0156794 A1 | 8/2004 | Barkalow et al. |
| 2004/0234648 A1 | 11/2004 | Mazurek et al. |
| 2004/0247746 A1 | 12/2004 | Pearce et al. |
| 2005/0220934 A1 | 10/2005 | Leadbeater et al. |

(56) References Cited

U.S. PATENT DOCUMENTS

| | | |
|---|---|---|
| 2005/0222256 A1 | 10/2005 | Erman et al. |
| 2005/0226990 A1 | 10/2005 | Pellecer et al. |
| 2005/0265930 A1 | 12/2005 | Erman et al. |
| 2006/0037910 A1 | 2/2006 | Shah et al. |
| 2006/0057276 A1 | 3/2006 | Carcasona et al. |
| 2006/0204451 A1 | 9/2006 | Salini |
| 2006/0280835 A1 | 12/2006 | Jani et al. |
| 2006/0286201 A1 | 12/2006 | Jani et al. |
| 2007/0014889 A1 | 1/2007 | McHale et al. |
| 2007/0137502 A1 | 6/2007 | Fornaguera |
| 2007/0141198 A1 | 6/2007 | Yang |
| 2007/0148303 A1 | 6/2007 | Yeager et al. |
| 2007/0160707 A1 | 7/2007 | Garcia |
| 2007/0184149 A1 | 8/2007 | Barkalow et al. |
| 2007/0196534 A1 | 8/2007 | Barkalow et al. |
| 2007/0231425 A1 | 10/2007 | Ream et al. |
| 2007/0231426 A1 | 10/2007 | Acar et al. |
| 2007/0231427 A1 | 10/2007 | Ream |
| 2007/0246483 A1 | 10/2007 | Boudy et al. |
| 2007/0286926 A1 | 12/2007 | Bunkers et al. |
| 2008/0095899 A1 | 4/2008 | Fornaguera |
| 2008/0160138 A1 | 7/2008 | Boghani et al. |
| 2008/0166449 A1 | 7/2008 | Kabse et al. |
| 2008/0187621 A1 | 8/2008 | Boghani et al. |
| 2008/0199564 A1 | 8/2008 | Boghani et al. |
| 2008/0248089 A1 | 10/2008 | Bugge et al. |
| 2009/0029018 A1 | 1/2009 | Elejalde et al. |
| 2009/0053390 A1 | 2/2009 | Sakou et al. |
| 2009/0123502 A1 | 5/2009 | Kumiega et al. |
| 2009/0142443 A1 | 6/2009 | Robinson et al. |
| 2009/0142444 A1 | 6/2009 | Jarrard, Jr. et al. |
| 2009/0214720 A1 | 8/2009 | Almenares et al. |
| 2010/0136165 A1 | 6/2010 | Miladinov et al. |
| 2011/0159142 A1 | 6/2011 | Marin et al. |
| 2011/0159143 A1 | 6/2011 | Elejalde et al. |
| 2011/0268837 A1 | 11/2011 | Jani |
| 2012/0034346 A1 | 2/2012 | Morgan |

FOREIGN PATENT DOCUMENTS

| | | | |
|---|---|---|---|
| EP | 0953295 A1 | 11/1999 | |
| EP | 1554935 A1 | 7/2005 | |
| GB | 2079129 A | 1/1982 | |
| GB | 2115672 A | 9/1983 | |
| GB | 2177587 A | 6/1986 | |
| JP | 48-5971 | 3/1973 | |
| JP | S60186250 | 9/1985 | |
| JP | S6443152 | 2/1989 | |
| JP | S6443153 | 2/1989 | |
| JP | 01128751 A | 5/1989 | |
| JP | H1-191646 | 8/1989 | |
| JP | H4-179445 | 6/1992 | |
| JP | 07123923 | 11/1993 | |
| JP | 6046760 A | 2/1994 | |
| JP | 09075005 | 9/1995 | |
| JP | 2002516672 | 6/2002 | |
| JP | 2003504041 | 2/2003 | |
| JP | 3107782 | 2/2005 | |
| JP | 3111014 | 7/2005 | |
| JP | 2005333946 | 12/2005 | |
| JP | 2006-158234 | 6/2006 | |
| JP | 2007215450 | 8/2007 | |
| JP | 2007289129 | 11/2007 | |
| JP | 2012197242 A | 10/2012 | |
| KR | 100231258 | 11/1999 | |
| KR | 20090039105 | 4/2009 | |
| KR | 100919653 B1 | 9/2009 | |
| WO | 9508926 | 4/1995 | |
| WO | 9726798 | 7/1997 | |
| WO | 0103513 | 1/2001 | |
| WO | 02056698 A1 | 7/2002 | |
| WO | 03032744 A1 | 4/2003 | |
| WO | 2006026298 A3 | 3/2006 | |
| WO | 2006063189 A3 | 6/2006 | |
| WO | 2006083784 A1 | 8/2006 | |
| WO | 2006118827 A3 | 11/2006 | |
| WO | 2006125334 A1 | 11/2006 | |
| WO | 2006127599 | 11/2006 | |
| WO | 2006127601 A3 | 11/2006 | |
| WO | 2006127602 A3 | 11/2006 | |
| WO | 2006127603 A3 | 11/2006 | |
| WO | 2007047227 A2 | 4/2007 | |
| WO | 2007051485 | 5/2007 | |
| WO | 2007070061 A1 | 6/2007 | |
| WO | 2007124093 A2 | 11/2007 | |
| WO | 2008016940 A1 | 2/2008 | |
| WO | 2008025809 A1 | 3/2008 | |
| WO | 2008030274 A1 | 3/2008 | |
| WO | 2008067207 A1 | 6/2008 | |
| WO | 2008100854 A1 | 8/2008 | |
| WO | 2008105908 A1 | 9/2008 | |
| WO | 2009135100 A1 | 11/2009 | |
| WO | 2009135101 A1 | 11/2009 | |
| WO | 2009135147 A1 | 11/2009 | |
| WO | 2009154887 | 12/2009 | |

OTHER PUBLICATIONS

Notice of Reasons for Rejection JP Patent Application No. 2011-548126 dated Jan. 8, 2013.
International Search Report and Written Opinion for PCT/US2010/021768, mailing date Mar. 19, 2010, 12 pages.
AU ER 2010206706 dated Jul. 17, 2012.
CN OA 201080005186.X dated Sep. 18, 2012.
U.S. Appl. No. 12/913,058, filed Oct. 27, 2010.
U.S. Appl. No. 12/990,096, National Stage Filed Oct. 28, 2010.
U.S. Appl. No. 12/990,319, National Stage Filed on Mar. 11, 2011.
U.S. Appl. No. 12/990,546, filed May 1, 2009.
U.S. Appl. No. 12/990,563, National Stage Filed Nov. 2, 2010.
JP2796425 B2, Abstract, Sep. 10, 1998, 1 page.
CN 2d OA 200980125641.7 dated Mar. 27, 2013.
CN 2nd OA 200980125643.6 dated Mar. 27, 2013.
DE3732677 A1, Abstract, Apr. 6, 1989, 1 page.
JP4179445 A, Abstract, Jun. 26, 1992, 1 page.
JP5308905 A, Abstract, Nov. 22, 1993, 1 page.
Nabors, L.O., Ed. 2001. "Alternative Sweeteners." 3rd ed. New York: M. Dekker. pp. 1, 340.
Boomer Super Bubble Gum—Apple, Report No. 315613, Publication Date Mar. 7, 2005.
Boomer Super Bubble Gum—Jelly Watermelon, Report No. 270287, Publication Date Sep. 1, 2003.
Boomer Fresh Gel Super Bubble Gum—Lemon Mint, Report No. 348893, Publication Date Jan. 23, 2006.
Boomer Super Bubble Gum—Mango Jelly, Report No. 391793, Publication Date Oct. 7, 2006.
Boomer Jelly Super Bubble Gum—Orange, Report No. 348891, Publication Date Jan. 23, 2006.
Chocolate Layer Cake with Caramel Ganache, posted Aug. 2010, retrieved Mar. 22, 2013]. Retrieved from Internet, http://heavenlycakeplace.blogspot.com/2010/08/chocolate-layer-cake-with-caramel.html.
CN OA Application No. 200980125809.4 dated May 9, 2013.
EP ER 10189107.5-1221 dated Jan. 20, 2012.
European Search Report, Application No. 10189107.5-1221 dated Mar. 8, 2011, 11 pages.
Fritz, "Using Confectionery Equipment of Manufacture Chewing Gum", The Manufacturing Confectioner, Nov. 2000, p. 45-48.
International Preliminary Report on Patentability and Written Opinion of the International Searching Authority. International Application No. PCT/US2009/042468. International Filing Date May 1, 2009, 8 pages.
International Preliminary Report on Patentability and Written Opinion of the International Searching Authority. International Application No. PCT/US2009/042478. International Filing Date May 1, 2009, 8 pages.
International Preliminary Report on Patentability and Written Opinion of the International Searching Authority. International Application No. PCT/US09/042495. International Filing Date May 1, 2009. 8 pages.

(56) References Cited

OTHER PUBLICATIONS

International Preliminary Report on Patentability and Written Opinion of the International Searching Authority. International Application No. PCT/US2009/042524. International Filing Date May 1, 2009, 8 pages.
International Preliminary Report on Patentability and Written Opinion of the International Searching Authority. International Application No. PCT/US2009/042557. International Filing Date May 1, 2009, 9 pages.
International Preliminary Report on Patentability and Written Opinion of the International Searching Authority. International Application No. PCT/US09/042573. International Filing Date May 1, 2009. 8 pages.
IPRP Apr. 19, 2012, PCT/US2010/051840.
ISR PCT US2010 051840, Jun. 30, 2011.
Joyco Boomer Jelly Bubble Gum—Pineapple, Report No. 293583, Publication Date Jun. 21, 2004.
JP OA Application No. 2011-507682 dated Jun. 18, 2013.
Kirk-Othmer Encyclopedia of Chem. Tech. 4th Ed. vol. 1, p. 492-494, 1991.
Non-Final Office Action, U.S. Appl. No. 29/407,928, dated Apr. 9, 2013.
CN OA 200980125821.5 dated Jun. 18, 2013.
CN OA Application No. 201080055962.7 dated May 28, 2013.
JP OA Application No. 2011-507673 dated Jun. 18, 2013.
JP OA 2012-022671 dated Mar. 26, 2013.
JP OA Application No. 2012-533320 dated Jun. 4, 2013.
Raleigh, "HSH as a Bulking Agent in Confections", The Manufacturing Confectioner, Nov. 1995, p. 57-59.
Mitchell, Helen, Ed. 2006. "Sweeteners and Sugar Alternatives in Food Technology," Chichester, GBR. Wiley. pp. 170-171.
Trident Layers, posted Sep./Oct. 2009, p. 4, [retrieved Mar. 22, 2013]. Retrieved from Internet, http://onlinedigitalpublishing.com/publication/?i=24473.
U.S. Appl. No. 13/499,979 National Stage Utility Application of PCT/US2010/051840 filed with on Apr. 3, 2012.
U.S. Appl. No. 29/407,928 Continuation Design Application filed Dec. 5, 2011.
Wolfgang Chocolate Dipped Berries, posted Sep./Oct. 2009, p. 51, [retrieved Mar. 22, 2013]. Retrieved from Internet, http://onlinedigitalpublishing.com/publication/?i=24473.
Wrigley's Doublemint Chewing Gum—Gel, Report No. 335513, Publication Date Oct. 3, 2005.
CN OA Application No. 201080005186.X dated Jun. 6, 2013.
JP OA 2011-548126 dated Jun. 11, 2013, English Translation.
Japanese Unexamined Patent Application (Translation of PCT Application), Publication No. 2004-517628, see reference listed under Prior Art Search Results in JP OA dated Jun. 11, 2013.
Japanese Unexamined Patent Application, Publication No. S50-46864, see reference listed under Prior Art Search Results in JP OA dated Jun. 11, 2013.
Japanese Unexamined Patent Application, Publication No. S64-39930, see reference listed under Prior Art Search Results in JP OA dated Jun. 11, 2013.
NPL Candy vs. Confectionery, retrieved from Internet on Aug. 29, 2013—cited in Sep. 10, 2013 Non-Final Office Action in U.S. Appl. No. 13/499,979.
JP 2003512445, with Eng Abstract; see also English equivalent US 6,417,346.
JP 2004534852, with Eng Abstract; see also English equivalent US 7,049,299.
JP 3rd OA, Application No. 200980125641.7 dated Sep. 26, 2013.
JP2009171961; Aug. 6, 2009; Machine Translation; 16 pages.
JP 2011-548126 OA dtd Oct. 22, 2013.
CN OA Application No. 200980125815.X dated Sep. 29, 2013.
JP 2011-507682 OA dtd Oct. 15, 2013.
JP OA 2012-533320 dated Nov. 19, 2013, with English Translation.
CN OA 102080005186.X dated Dec. 24, 2013.
EP ER 10701301.3-1358_Jan. 16, 2014.
EP Er 12000487.4 dated Jan. 20, 2014.
EP OA Application No. 09739902.6-1357 dated Mar. 31, 2014.
CN OA 200980125643.6 dated Oct. 15, 2013.
JP OA 2011507674 dated Feb. 4, 2014.
JP OA 20111597689 dated Feb. 4, 2014.
AU ER Patent Application No. 2013206700 dated Apr. 10, 2014.
CN OA Aplication No. 200980125641.7 dated Mar. 14, 2014.
CN OA Application No. 201080055962.7 dated Apr. 2, 2014.
CN OA Application No. 2000980125642.1_dated Nov. 1, 2013.
CN OA Application No. 200980125809.4_dated Nov. 7, 2013.
EP SR 10822704.2 dated Jul. 11, 2014.
OA Application No. 09 739 902.6-1357, dated Sep. 24, 2014.
OA Application No. 2011-507674, dated Oct. 14, 2014.
OA Application No. 2011-507689, dated Oct. 14, 2014.
OA Application No. 2013-102743, dated Sep. 30, 2014.
AU ER 2013206701 dated Aug. 8, 2014.
CN OA 201080005186.X dated Aug. 5, 2014.
JP OA 2013-097962 dated Aug. 19, 2014.
Dodson, A.G., Pepper, T. 1985, "Confectionery Technology and the Pros and Cons of Using Non-sucrose Sweeteners." Food Chemistry. vol. 16. pp. 271-280.
Non-Final Office Action dated Dec. 17, 2014, U.S. Appl. No. 12/990,563.
Non-Final Office Action dated Jan. 28, 2015, U.S. Appl. No. 12/990,546.
Non-Final Office Action dated Mar. 13, 2015, U.S. Appl. No. 12/990,096.
EP ER dated Jan. 22, 2015, Application No. 10 701 301.3-1358.
MX OA dated Jan. 30, 2015, with English translation, Applicaiton No. MX/a/2012/004126.
CN OA dated Feb. 16, 2015, with English Translation, Application No. 200980125815.X.

\* cited by examiner

Chewing Gum Formation Process

Candy Formation Process

Multi-Layered Gum/Candy Formation Process

CONFECTIONERY PROCESSING

CROSS REFERENCE TO RELATED APPLICATIONS

This is a U.S. national stage of application No. PCT/US2010/021768, filed on 22 Jan. 2010, which claims priority to 61/146,351 filed 22 Jan. 2009, the disclosures of which is incorporated herein by reference.

FIELD

The present invention relates to methods of forming confectionery products. In particular, the invention relates to methods of improving the homogeneity in the confectionery mixing process.

BACKGROUND

Confectionery products may be formed through various processes. Typically, confectionery products, especially chewing gum products, are formed through a process of mixing components, extruding the components, and cutting the components. However, through typical processes, the homogeneity of the confectionery product may not be optimized. Further, in typical confectionery processing, there is usually a need to allow the final product to set for a lengthy period of time so that the product may expand or contract to its final size. In some situations, only after the confectionery has settled for the required period of time can it then be packaged for distribution. This lengthy period of time is undesirable, as it greatly slows down the process of making and processing confectioneries.

The present invention seeks to avoid the problems associated with typical confectionery processing by providing a process which improves the homogeneity in the confectionery, allowing for convenient processing and timely packaging of the product.

SUMMARY

In one embodiment of the invention, there is provided a method of improving homogeneity in confectionery mixing processes, which includes the steps of: mixing a predetermined amount of confectionery base and bulk sweeteners in a first direction for a first cycle period to provide a mixture; adding a predetermined amount of a flavoring component to the mixture; mixing the mixture in a second direction for a second cycle period; mixing the mixture in the first direction for a third cycle period.

In another embodiment of the invention, there is provided a method of preparing a confectionery product, including the steps of: mixing a predetermined amount of products in a kettle to form a confectionery base; heating the mixed confectionery base to a predetermined temperature; feeding the heated confectionery base into a first extruder; extruding the confectionery base into a cooling apparatus to provide a cooled confectionery product; feeding the cooled confectionery product into a second extruder; extruding the cooled confectionery product from the second extruder; and passing the extruded confectionery product into a finishing apparatus to form individually wrapped confectionery pieces.

In yet another embodiment, there is provided a method of preparing a multi-layered confectionery product, including the steps of: mixing a predetermined amount of confectionery product in a kettle; heating the mixed confectionery product to a predetermined temperature; feeding the heated confectionery product into an extruder; extruding the confectionery product into a cooling apparatus to provide a cooled confectionery product; feeding the cooled confectionery product into a multi-layered extruder; extruding the cooled confectionery product to form a multi-layered confectionery product; and passing the multi-layered confectionery product into a finishing apparatus.

DETAILED DESCRIPTION OF THE PREFERRED EMBODIMENTS

As used herein, the term "confection", or "confectionery" may include any conventional confectionary composition, such as gummy candy or "gummi" confections (gummy candy includes a hydrocolloid texturizing agent such as gelatin alone or in combination with other texturizing agents). Also included in those chewable forms are soft candies such as, but not limited to, gum drops, licorice, fruit snacks, starch based jellies, gelatin based jellies, pectin based jellies, carageenan based jellies, agar based jellies, konjac based jellies, chewy candy, starch candy, nougat, toffee, taffy, marshmallow, fondant, fudge, chocolate, compound coating, carob coating, caramel, compressed tablets, candy floss (also known as cotton candy), marzipan, hard boiled candy, nut brittles, pastilles, pralines, nonpareils, dragees, lozenges, sugared nuts, comfits, aniseed balls, nougatine, and jelly beans. Also included in those chewable forms are chewing gums including bubble gums. In some embodiments, the confectionery is selected from the group consisting of chewy candy, gummy candy, marshmallow, chewing gum, and combinations thereof.

In one aspect of the invention, there is provided a method of processing a confectionery product. The confectionery product may be singled layered or may be multi-layered. Further, the confectionery product may include various confectioneries as defined above. In one particular embodiment, the confectionery product includes chewing gum, candy, or combinations thereof.

Figure 1:
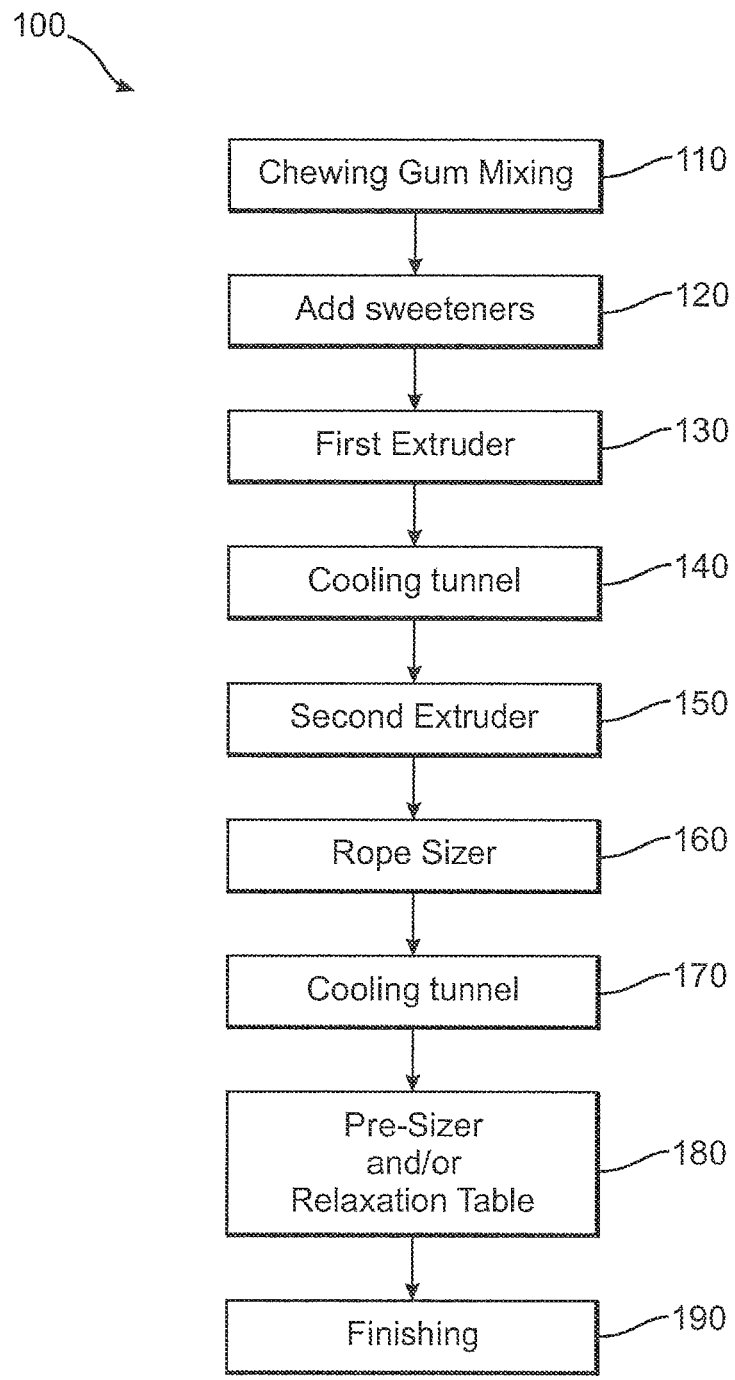
FIG. 1 depicts one embodiment of processing a multi-layered chewing gum composition.

With reference to FIG. 1, there is depicted a method of forming a chewing gum product. A process 100 forms a chewing gum product, which may be single-layered or it may be multi-layered, depending on the desired end product. In a first step 110, there is mixed an initial combination of components in a heated environment. Such components may include, for example, flavors, colors, additives, fillers, and the like. Suitable sweeteners, flavors, potentiators, sensates, functional ingredients, and acids include those described in U.S. patent application Ser. No. 11/829,232, filed Jul. 27, 2007, and Ser. No. 12/100,046, filed Apr. 9, 2008, the entire contents of which are incorporated by reference herein. For the chewing gum compositions, the initial combination may include a chewing gum base. In a chewing gum composition, the chewing gum base is heated to a predetermined temperature to sufficiently melt the chewing gum base. The heated environment may include a heated kettle. Preferably, the chewing gum base is heated to a temperature of about 85° C. Further, the chewing gum base may be heated and mixed in a series of cycles. For example, the mixing step 110 may include one cycle, two cycles, or more than two cycles. The mixing step 110 may include three mixing cycles, where the first cycle is a forward mixing cycle, the second cycle is a backward mixing cycle, and the third cycle is a forward mixing cycle. The mixing step 110 may be any length of time, and in a preferred embodiment is about 15-35 minutes in total. In some embodiments, a shorter mixing time may be desired, such as about 15 to about 20 minutes in total, while in other embodiments, a longer mixing time may be desired, such as about 30 to about 35 minutes in total.

The first mixing cycle, the second mixing cycle and the third mixing cycle may be different lengths of time or they may be approximately the same length of time. In one embodiment, the first cycle may be about 5 to about 14 minutes, may be about 5 to about 10 minutes, or may be about 10 to about 14 minutes. If used, the second cycle may be about 1 to about 5 minutes. If used, the third cycle may be about 10 to about 20 minutes, and more preferably about 15 to about 20 minutes. Any combination of first, second and third mixing cycles may be performed as desired.

In some embodiments, it may be desirable to begin the first mixing cycle prior to adding a flavoring component. For example, it may be desirable to perform the first mixing cycle for about 5 to about 10 minutes, then mix for about 5 to about 10 minutes while adding a flavoring component. Optionally, a second mixing cycle may then be performed, which may run for about 1 to about 5 minutes, and then a third optional mixing cycle may be performed, which may run for about 15 to about 20 minutes.

For such chewing gum compositions formed by the process 100, the heated and mixed product then undergoes a step 120 of adding bulk sweeteners to the gum base mixture. In addition to bulk sweeteners, any other components may be added if desired, including colors, flavors, additives, fillers, and the like. The step 120 of adding bulk sweeteners may occur at any time, and desirably occurs after the step 110 of mixing has completed. Preferably, the mixture may be cooled down to a lower temperature prior to adding bulk sweeteners to the mixture. For example, the mixture may be cooled to a temperature of about 50 to about 60° C. prior to step 120 of adding bulk sweeteners. The step 120 of adding bulk sweeteners may optionally occur during the step 110 of mixing the chewing gum base. For example, sweeteners may be added between one or more of the mixing cycles, or may be added during a mixing cycle.

After the sweeteners have been mixed for a sufficient time period to provide a homogenous mixture, the mixture may go through a step 130 of passing the mixture through a first extruder. The first extruder may be a recycling extruder, which has an input port for accepting the mixture and at least two extruding ports for extruding the mixture. In this embodiment, at least one extruding port leads the extruded mixture back into the first extruder, where it is extruded at least one more time. In a desired embodiment, about 50% of the mixture is fed back into the extruder after extruding, and about 50% is extruded to the next step of the formation process. Any amount of the mixture may be fed back into the first extruder, and may be extruded any desired amount of times.

The portion of the mixture that is extruded and not fed back into the first extruder may continue to a next step 140 of passing through a cooling tunnel. Desirably, upon extrusion, the mixture is extruded in a rope, but may be extruded in any desired fashion, including rope, tube, or sheet. The cooling tunnel may be any apparatus that operates to cool the mixture. The cooling tunnel is preferably maintained at a temperature below room temperature, and is most desirably about 15° C. Depending upon the desired level of cooling of the extruded product, the cooling tunnel may be any temperature sufficient to achieve the level of cooling desired. The cooling tunnel may force the extruded mixture along a "zig zag" path, thereby maintaining the mixture within the cooling tunnel for an extended period of time. For example, the cooling tunnel may have several zig zagging pathways, such that the mixture is passed along a plurality of separate paths before exiting the cooling tunnel. For example, the cooling tunnel may include a pathway that passes the extruded product about 5 times before exiting the cooling tunnel. It will be understood that the term "cooling tunnel" does not specifically require a tunnel through which the confectionery is passed, and includes any area whereby a cooling temperature may be applied to the confectionery. For example, the extruded confectionery may be transported through a cooled room, or there may simply be a cooling element which directs cool temperature to the extruded confectionery.

Desirably, after the step 140 of passing through a cooling tunnel, the extruded and cooled chewing gum mixture has a temperature of about 30-50° C. In particular, for chewing gum compositions, the cooled product preferably has a temperature of about 45-50° C. after exiting the cooling tunnel. It is to be understood that, to achieve the temperature desired, the step 140 of passing the product through a cooling tunnel may be unnecessary.

Once the product has achieved the desired temperature, whether through passing through a cooling tunnel or otherwise, the product may then undergo the step 150 of entering a second extruder. The second extruder may be a single layered extruder or it may be a multi-layered extruder, which will be described in more detail below. Further, the second extruder may include one input port or it may include more than one input port. For example, the second extruder may include a plurality of input ports, designed to accept more than one product, which is then processed in the extruder and extruded through an output port. In embodiments where the second extruder is a multi-layered extruder, the extruded product may be a multi-layered extrudate, having the same or different layers.

Desirably, the composition is extruded from the second extruder in the form of a rope of confectionery, in both single-layered and multi-layered forms. After the composition exits the second extruder, the extruded composition may optionally go through the step 160 of entering a rope sizing apparatus. The rope sizing apparatus desirably is capable of sizing the extruded composition to a desired height and/or width. In a desired embodiment, the rope sizing apparatus is capable of providing both vertical and horizontal sizing to the extruded composition. One example of a rope sizing apparatus is that disclosed in Applicant's co-pending application, U.S. patent application Ser. No. 12/180,207, filed Jul. 25, 2008, which is incorporated in its entirety herein. After the confection has gone through the rope sizing apparatus, the confectionery is sized to the appropriate height and/or width.

Once the confectionery composition has been appropriately sized, the sized composition may optionally enter another cooling tunnel 170, where the composition is cooled to a desired temperature. As with above, the cooling tunnel may be capable of providing multiple passes of the composition in a zig zag formation, and in a desired embodiment the cooling tunnel 170 provides between about 9-13 passes of the composition. The cooling tunnel may be cooled to any desired temperature so as to cool the composition to the desired end temperature. The cooling tunnel is preferably kept at a temperature of about 15° C. Again, depending upon the temperature of the confectionery product after it has been sized, and the desired end temperature, the step 170 of entering another cooling tunnel may be rendered unnecessary.

After the cooled composition has reached the desired temperature, the cooled composition may optionally be fed through a pre-sizing apparatus and/or a relaxation table 180. One example of a relaxation table is that disclosed in Applicant's co-pending application U.S. patent application Ser. No. 12/180,207, filed Jul. 25, 2008, which is incorporated in its entirety herein. The cooled composition may be fed through the pre-sizing apparatus and/or relaxation table for any desired time to allow the composition to reach a desired relaxed state. It is generally known that after stretching and extending confectionery ropes, specifically chewing gums, the rope has a tendency to "spring back" and shrink to its normal size. By "relaxation table," it is contemplated that any mechanism to allow the composition to "relax" and shrink prior to cutting may be used. The relaxation table provides a sufficient time delay between extrusion and cutting, to allow the composition to get to a more stable form. After this step 180 has been completed, the composition is in its final size and form. The composition is ready to be finished.

Once the composition has been appropriately sized and has reached its desired temperature, the composition undergoes a finishing step 190, which completes the composition forming process. The finishing step 190 may include any desired steps to prepare the composition for final packaging and/or distribution. For example, the finishing step 190 may include the steps of cutting the composition, forming individual pieces of the composition, coating the final composition, wrapping the composition, packaging the formation, and combinations thereof. In one embodiment, the finishing step 190 includes the step of cutting and wrapping individual pieces of chewing gum to be packaged into a rigid package. In another embodiment, the finishing step 190 may include the steps of rolling and scoring the confectionery composition.

Figure 2:
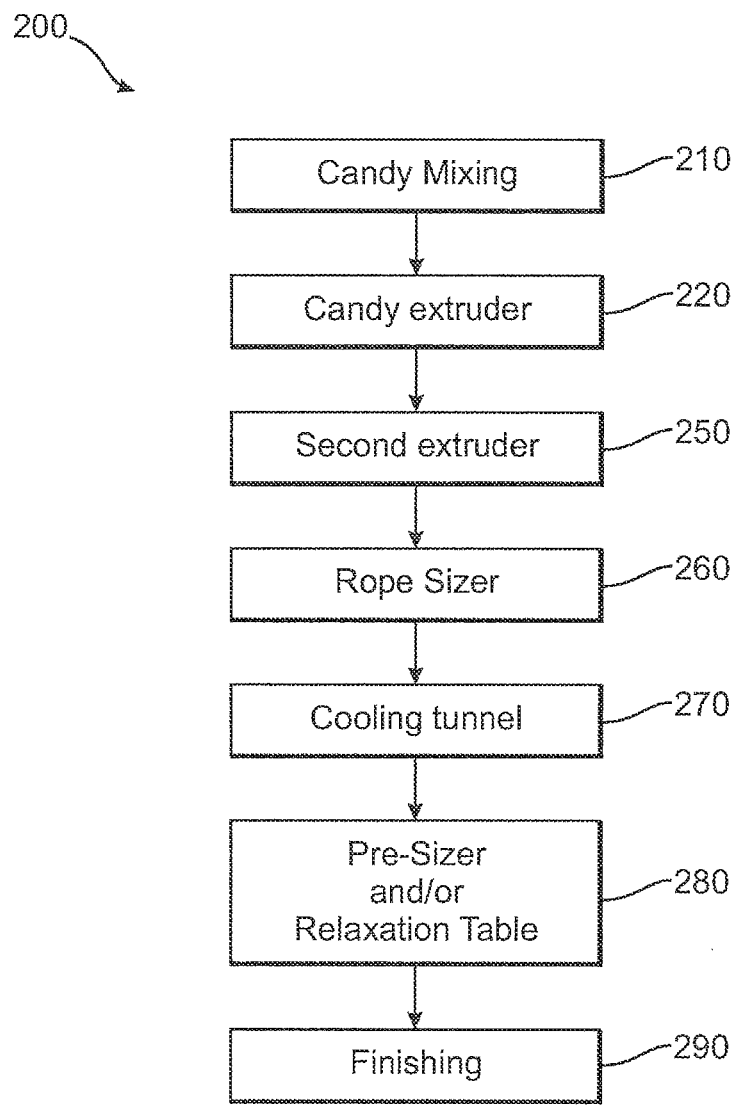
FIG. 2 depicts one embodiment of processing a multi-layered candy composition.

As set forth in FIG. 2, the present invention also provides a process 200 of forming a candy composition. The term "candy composition" is used to refer to any non-chewing gum confectionery. For example, candy compositions formed through the process described herein include gummy candy or "gummi" confections, gum drops, licorice, fruit snacks, starch based jellies, gelatin based jellies, pectin based jellies, carageenan based jellies, agar based jellies, konjac based jellies, chewy candy, starch candy, nougat, toffee, taffy, marshmallow, fondant, fudge, chocolate, compound coating, carob coating, caramel, compressed tablets, candy floss (also known as cotton candy), marzipan, hard boiled candy, nut brittles, pastilles, pralines, nonpareils, dragees, lozenges, sugared nuts, comfits, aniseed balls, nougatine, and jelly beans. In some embodiments, the confectionery is selected from the group consisting of chewy candy, gummy candy, marshmallow, chewing gum, and combinations thereof.

The formation of a candy composition is similar to the process 100 for the chewing gum composition described above. However, for formation of candy compositions, there is a step 210 of mixing the candy composition in any desired fashion. Preferably, the candy composition is mixed in a kettle for a sufficient time to provide a substantially homogenous mixture. The particular temperature and time of mixing is not critical to the step 210 of mixing the candy composition. After the step 210 of mixing the candy composition, the candy composition may then be fed into and through a candy extruder 220. The candy extruder may or may not be a recycling extruder, as described above, depending upon the desired confectionery product being processed. The candy composition is preferably extruded in the form of a rope of candy.

After the step 220 of feeding through a candy extruder, the extruded candy preferably has a temperature of about 35-40° C. The extruded candy composition may have a higher or lower temperature, depending upon the particular process desired. To achieve the desired temperature, the candy composition may optionally enter a cooling tunnel. Generally, however, the candy composition may simply reach the desired temperature through the step 210 of mixing and the extrusion at room temperature.

Once the extruded candy composition has achieved the desired temperature, whether through passing through a cooling tunnel or otherwise, the candy composition may then undergo the step 250 of entering a second extruder. The second extruder may be a single layered extruder or it may be a multi-layered extruder, as will be described in more detail below. The second extruder may include one input port or it may include more than one input port. For example, the second extruder may include a plurality of input ports, designed to accept more than one product, which is then processed in the extruder and extruded through an output port. As with the chewing gum process 100, more than one type of confectionery may be fed into the second extruder, including both a candy and a chewing gum composition.

Desirably, the composition is extruded from the second extruder in the form of a rope of confectionery, in both single-layered and multi-layered forms. After the composition exits the second extruder, the extruded composition may optionally go through the step 260 of entering a rope sizing apparatus. The rope sizing apparatus desirably is capable of sizing the extruded composition to a desired height and/or width. In a desired embodiment, the rope sizing apparatus is capable of providing both vertical and horizontal sizing to the extruded composition. One example of a rope sizing apparatus is that disclosed in Applicant's co-pending application, U.S. patent application Ser. No. 12/180,207, filed Jul. 25, 2008, which is incorporated in its entirety herein. After the confection has gone through the rope sizing apparatus, the confectionery is sized to the appropriate height and/or width.

Once the confectionery composition has been appropriately sized, the sized composition may optionally enter another cooling tunnel 270, where the composition is cooled to a desired temperature. As with above, the cooling tunnel may be capable of providing multiple passes of the composition in a zig zag formation, and in a desired embodiment the cooling tunnel 270 provides between about 9-13 passes of the composition. The cooling tunnel may be cooled to any desired temperature so as to cool the composition to the desired end temperature. In one embodiment, the cooling tunnel is kept at a temperature of about 15° C. Again, depending upon the temperature of the confectionery product after it has been sized, and the desired end temperature, the step 270 of entering another cooling tunnel may be rendered unnecessary.

After the cooled composition has reached the desired temperature, the cooled composition may optionally be fed through a pre-sizing apparatus and/or a relaxation table 280. One example of a relaxation table is that disclosed in Applicant's co-pending application, U.S. patent application Ser. No. 12/180,207, filed Jul. 25, 2008, which is incorporated in its entirety herein. As explained above, the composition may be fed through the pre-sizing apparatus and/or relaxation table for any desired length of time so as to allow the composition to settle to its desired shape and size. After this step 280 has been completed, the composition is in its final size and form. The composition is ready to be finished.

Once the composition has been appropriately sized and has reached its desired temperature, the composition undergoes a finishing step 290, which completes the composition forming process. The finishing step 290 may include any desired steps to prepare the composition for packaging. For example, the finishing step 290 may include the steps of cutting the composition, coating the final composition, forming the final composition, wrapping the composition, packaging the formation, and combinations thereof. In one embodiment, the finishing step 290 includes the step of cutting and wrapping individual pieces of candy to be packaged into a rigid package. In another embodiment, the finishing step 290 may include the steps of rolling and scoring the confectionery composition.

Figure 3:
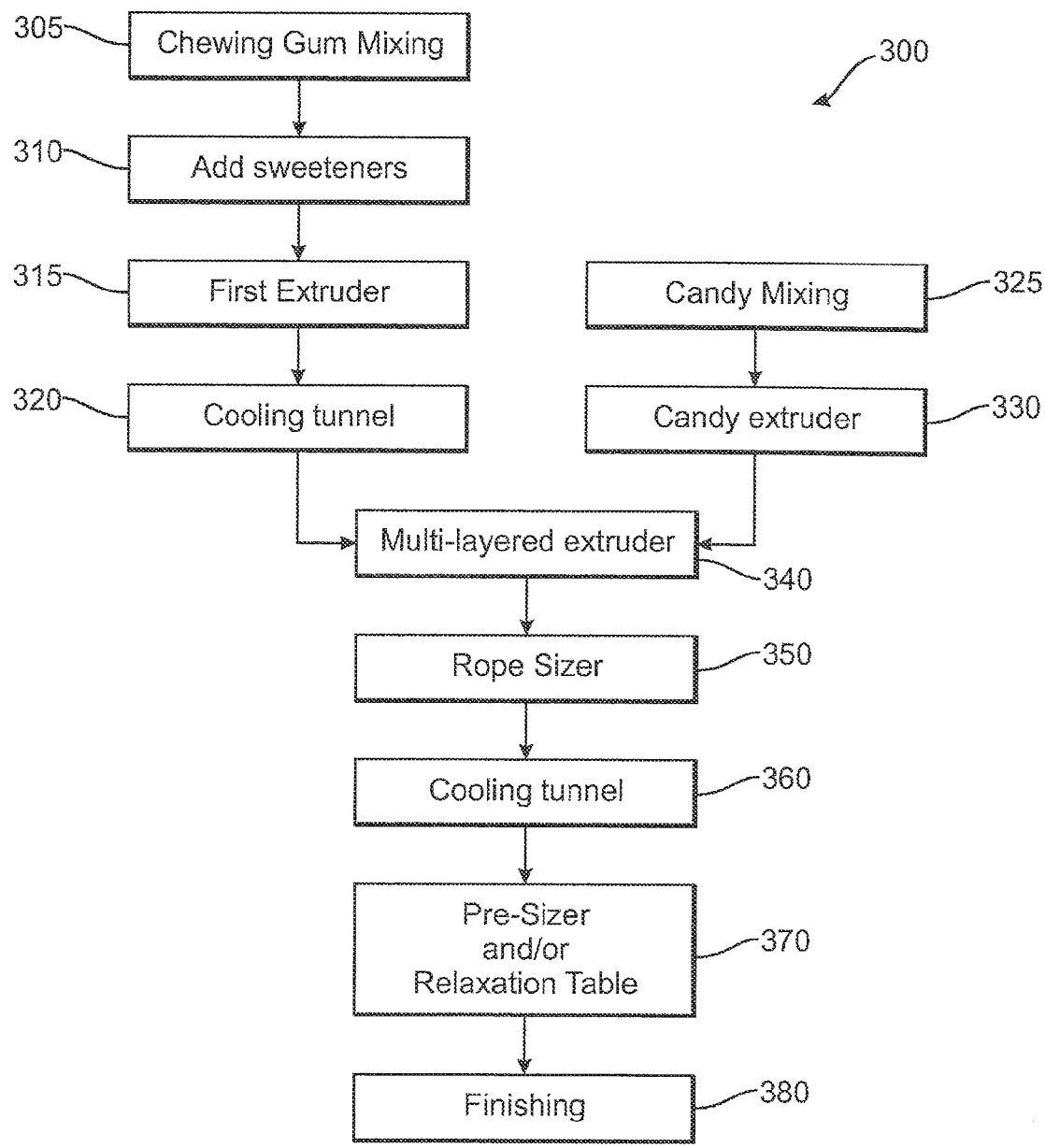
FIG. 3 depicts one embodiment of processing a multi-layered chewing gum and candy composition.

With reference to FIG. 3, there is provided a process 300 of forming a multi-layered candy/chewing gum composition. As with the processes of forming a chewing gum product 100 and a candy confectionery product 200, the process 300 of forming a multi-layered candy/chewing gum composition includes various mixing and extruding steps. Products formed by the process 300 have a multi-layered configuration, which includes any combination of chewing gum and candy composition layers.

With reference to FIG. 3, there is depicted a method of forming a multi-layered chewing gum and candy product. A process 300 forms the multi-layered product, which steps are similar to that described above. In a first step 305, there is mixed an initial combination of components in a heated environment. As with the process of forming a chewing gum 100 described above, at this stage, other components may be added if desired. For example, flavors, colors, additives, fillers, and the like may be added. For the chewing gum compositions, the initial combination may include a chewing gum base. In a chewing gum composition, the chewing gum base is heated to a predetermined temperature to sufficiently melt the chewing gum base. The heated environment may include a heated kettle. Preferably, the chewing gum base is heated to a temperature of about 85° C. Further, the chewing gum base may be heated and mixed in a series of cycles. For example, the mixing step 305 may include one cycle, two cycles, or more than two cycles. The mixing step 305 may include three mixing cycles, where the first cycle is a forward mixing cycle, the second cycle is a backward mixing cycle, and the third cycle is a forward mixing cycle. The mixing step 305 may be any length of time, and in a preferred embodiment is about 15-35 minutes. As with the process for a multi-layered chewing gum described above, in some embodiments, a shorter mixing time may be desired, such as about 15 to about 20 minutes in total, while in other embodiments, a longer mixing time may be desired, such as about 30 to about 35 minutes in total.

The first mixing cycle, the second mixing cycle and the third mixing cycle may be different lengths of time or they may be approximately the same length of time. In one embodiment, the first cycle may be about 5 to about 14 minutes. Optionally the first cycle may be about 5 to about 10 minutes, or it may be about 10 to about 14 minutes. If used, the second cycle may be about 1 to about 5 minutes. If used, the third cycle may be about 10 to about 20 minutes, and more preferably about 15 to about 20 minutes. Any combination of first, second and third mixing cycles may be performed as desired.

In some embodiments, it may be desirable to begin the first mixing cycle prior to adding a flavoring component. For example, it may be desirable to perform the first mixing cycle for about 5 to about 10 minutes, then mix for about 5 to about 10 minutes while adding a flavoring component. Optionally, a second mixing cycle may then be performed, which may run for about 1 to about 5 minutes, and then a third optional mixing cycle may be performed, which may run for about 15 to about 20 minutes.

For such chewing gum compositions formed by the process 300, the heated and mixed product then undergoes a step 310 of adding bulk sweeteners to the gum base mixture. Other components may be added at this stage if desired, including flavors, colors, additives, fillers, and the like. The step 310 of adding bulk sweeteners may occur at any time, and desirably occurs after the step 305 of mixing has completed. Preferably, the mixture may be cooled down to a lower temperature prior to adding bulk sweeteners to the mixture. For example, the mixture may be cooled to a temperature of about 50 to about 60° C. prior to step 310 of adding bulk sweeteners. The step 310 of adding bulk sweeteners may optionally occur during the step 305 of mixing the chewing gum base. For example, sweeteners may be added between one or more of the mixing cycles, or may be added during a mixing cycle.

After the sweeteners have been mixed for a sufficient time period to provide a homogenous mixture, the mixture may go through a step 315 of passing the mixture through a first extruder. The first extruder may be a recycling extruder, which has an input port for accepting the mixture and at least two extruding ports for extruding the mixture. In this embodiment, at least one extruding port leads the extruded mixture back into the first extruder, where it is extruded at least one more time. In a desired embodiment, about 50% of the mixture is fed back into the extruder after extruding, and about 50% is extruded to the next step of the formation process. Any amount of the mixture may be fed back into the first extruder, and may be extruded any desired amount of times.

The portion of the mixture that is extruded and not fed back into the first extruder may continue to a next step 320 of passing through a cooling tunnel. Desirably, upon extrusion, the mixture is extruded in a rope, but may be extruded in any desired fashion, including rope, tube, or sheet. The cooling tunnel may be any apparatus that operates to cool the mixture. The cooling tunnel is preferably maintained at a temperature below room temperature, and is most desirably about 15° C. Depending upon the desired level of cooling of the extruded product, the cooling tunnel may be any temperature sufficient to achieve the level of cooling desired. The cooling tunnel may force the extruded mixture along a "zig zag" path, thereby maintaining the mixture within the cooling tunnel for an extended period of time. For example, the cooling tunnel may have several zig zagging pathways, such that the mixture is passed along a plurality of separate paths before exiting the cooling tunnel. For example, the cooling tunnel may include a pathway that passes the extruded product about 5 times before exiting the cooling tunnel. It will be understood that the term "cooling tunnel" does not specifically require a tunnel through which the confectionery is passed, and includes any area whereby a cooling temperature may be applied to the confectionery. For example, the extruded confectionery may be transported through a cooled room, or there may simply be a cooling element which directs cool temperature to the extruded confectionery.

Desirably, after the step 320 of passing through a cooling tunnel, the extruded and cooled chewing gum mixture has a temperature of about 30-50° C. In particular, for chewing gum compositions, the cooled product preferably has a temperature of about 45-50° C. after exiting the cooling tunnel. It is to be understood that, to achieve the temperature desired, the step 320 of passing the product through a cooling tunnel may be unnecessary.

The process 300 also includes the formation of a candy composition. For formation of candy compositions, there is a step 325 of mixing the candy composition in any desired fashion. Preferably, the candy composition is mixed in a kettle for a sufficient time to provide a substantially homogenous mixture. The particular temperature and time of mixing is not important to the step 325 of mixing the candy composition. After the step 325 of mixing the candy composition, the candy composition may then be fed into and through a candy extruder 330. The candy extruder may or may not be a recycling extruder, as described above, depending upon the desired confectionery product being processed. The candy composition is preferably extruded in the form of a rope of candy.

After the step 330 of feeding through a candy extruder, the extruded candy preferably has a temperature of about 35-40° C. The extruded candy composition may have a higher or lower temperature, depending upon the particular process desired. To achieve the desired temperature, the candy composition may optionally enter a cooling tunnel. Generally, however, the candy composition may simply reach the desired temperature through the step 325 of mixing and the extrusion at room temperature.

Once the chewing gum composition and the candy composition have reached their respective desired temperatures, the compositions are separately fed into a second extruder 340. To form a multi-layered confectionery product, the second extruder may be a multi-layered extruder. The multi-layered extruder may include one input port, or it may include two or more input ports, which are designed to accept more than one composition. The compositions to be inputted may be the same or they may be different. Once the composition is fed into one of the input ports, the composition is processed in a separate extruding compartment from the other compositions which may have been fed into a separate input port. The compositions may then be extruded through one or more output ports to form a second extruded product. The compositions that are to be extruded from the second extruder may be extruded simultaneously to form a multi-layered confectionery extrudate, as will be described in more detail below.

If desired, the process may include more than one type of confectionery fed into the second extruder. In some embodiments, the process may include a chewing gum composition fed into one input port of the second extruder and a non-chewing gum candy composition fed into a second input port of the second extruder. Preferably, the chewing gum and non-chewing gum candy compositions are fed into distinct compartments in the second extruder. In this fashion, the chewing gum composition and the non-chewing gum candy composition may be processed separately and extruded via separate output ports. Desirably, the output ports are located at positions proximal to each other, such that the extruded compositions are touching, or are nearly touching, upon extrusion. Thus, the second extruder may form a multi-layered confectionery extrudate.

There may be two or more simultaneous output ports for forming the confectionery extrudate. For example, the extruded composition may have a layer of candy extruded between two layers of chewing gum, and vice versa. Alternatively, the extruded composition may have a plurality of layers of chewing gum, or it may have a plurality of layers of candy. In embodiments wherein a chewing gum/candy multi-layered confectionery is to be formed, the candy preferably has a temperature that is about 5-10° C. cooler than the chewing gum composition upon extrusion. For example, if the chewing gum component of the confection is extruded at a temperature of about 45-50° C., the candy composition preferably is extruded at a temperature of about 35-40° C.

Desirably, the composition is extruded from the second extruder in the form of a multi-layered rope of confectionery. After the composition exits the second extruder, the extruded composition may optionally go through the step 350 of entering a rope sizing apparatus. The rope sizing apparatus desirably is capable of sizing the extruded composition to a desired height and/or width. In a desired embodiment, the rope sizing apparatus is capable of providing both vertical and horizontal sizing to the extruded composition. One example of a rope sizing apparatus is that disclosed in Applicant's co-pending application, U.S. patent application Ser. No. 12/180,207, filed Jul. 25, 2008, which is incorporated in its entirety herein. After the confection has gone through the rope sizing apparatus, the confectionery is sized to the appropriate height and/or width.

Once the confectionery composition has been appropriately sized, the sized composition may optionally enter another cooling tunnel 360, where the composition is cooled to a desired temperature. As with above, the cooling tunnel may be capable of providing multiple passes of the composition in a zig zag formation, and in a desired embodiment the cooling tunnel 360 provides between about 9-13 passes of the composition. The cooling tunnel may be cooled to any desired temperature so as to cool the composition to the desired end temperature. In one embodiment, the cooling tunnel is kept at a temperature of about 15° C. Again, depending upon the temperature of the confectionery product after it has been sized, and the desired end temperature, the step 360 of entering another cooling tunnel may be rendered unnecessary.

After the cooled composition has reached the desired temperature, the cooled composition may optionally be fed through a pre-sizing apparatus and/or a relaxation table 370. One example of a relaxation table is that disclosed in Applicant's co-pending application, U.S. patent application Ser. No. 12/180,207, filed Jul. 25, 2008, which is incorporated in its entirety herein. After this optional step 370 has been completed, the composition is in its final size and form. The composition is ready to be finished.

Once the composition has been appropriately sized and has reached its desired temperature, the composition undergoes a finishing step 380, which completes the composition forming process. In one embodiment, the finishing step 380 may include any desired steps to prepare the composition for packaging. For example, the finishing step 380 may include the steps of cutting the composition, forming the finished composition, coating the composition, wrapping the composition, packaging the formation, and combinations thereof. In one embodiment, the finishing step 380 includes the step of cutting and wrapping individual pieces of confectionery to be packaged into a rigid package. In another embodiment, the finishing step 380 may include the steps of rolling and scoring the confectionery composition.

Any combination of chewing gum compositions and/or candy compositions may be processed in this fashion. For example, in any given confectionery product, there may be more than one flavor of candy composition, which may be extruded to form a multi-layered candy composition, wherein each layer has a separate flavor. Alternatively, there may be more than one flavor of chewing gum composition fed into the multi-layered extruder and a candy composition fed into the multi-layered extruder, which may then be co-extruded. Each layer in the confectionery product may have a different flavor, color, texture, composition, or any desired quality.

Through the particular heating, cooling, and sizing steps described above for chewing gum processing and/or for candy composition processing, the final product is capable of being directly cut and wrapped and packaged into a rigid packaging without the traditional need for allowing the composition to settle for a length of time. The heating, cooling, and sizing steps described herein allow for the formation of a composition that is not subject to undesirable expansion or contraction after it is individually formed, which allows the cut and wrapped composition to be packaged into the rigid package. The processing methods described herein may be better understood through reference to the following Examples, which are intended to describe the invention and are not intended to be limiting in any way.

EXAMPLES

Example 1

Process of Mixing Gum

A gum base is first melted in a jacketed sigma blade melter at a temperature sufficient to melt the gum base. The jacket is set at a temperature to obtain a product temperature between 83-88° C. Once melted, the gum base is fed into a gum base holding tank.

A separate kettle is heated to about 45-50° C. Into the kettle, the following components are added at the times indicated in Table 1 below:

TABLE 1

Gum Mixing Process

| Time (min) | Step |
|---|---|
| 0 | Add powdered components (including sweeteners, colors) |
| 1 | Mix powdered components in forward direction for 1 minute; then mix for 2 minutes in reverse direction |
| 1 | Add melted gum base |
| 1 | Add melted emulsifiers and polyols (including emulsifiers such as lecithin, and polyols such as Lycasin) |
| 7 | Mix for 6 minutes forward |
| 13 | Continue to mix for 6 minutes forward, while adding flavoring components |
| 15 | Mix for 2 minutes in reverse |
| 17 | Mix for 2 minutes forward |
| 17 | Add sweeteners and acids |
| 17 | Continue to mix fro 12 minutes forward |
| 29 | Mix for 2 minutes reverse |
| 31 | Mix for 2 minutes forward |
| 33 | Finish mixing |

At the completion of the mixing process, the mixed gum temperature should be about 52 to about 58° C. The mixed gum then may then be extruded and formed into individual pieces. This process of mixing may be useful for any type of final gum product, whether single layered, multi-layered, or multi-layered with gum and candy layers.

What is claimed is:

1. A method of preparing a confectionery, comprising the steps of:
   a. feeding a chewing gum composition into a multi-layered extruder;
   b. feeding a candy composition into the multi-layered extruder;
   c. extruding a multi-layered confectionery composition from the said multi-layered extruder to form a multi-layered confectionery product including a first layer of said chewing gum composition, a second layer of said chewing gum composition, and a third layer of said candy composition sandwiched between said first layer of said chewing gum composition and said second layer of said chewing gum composition,
   wherein said chewing gum composition of said multi-layered confectionery product is extruded from said multi-layered confectionery extruder at 45-50 degrees C., and a said candy composition of said multi-layered product is extruded from said multi-layered extruder at 35-40 degrees C.; and
   d. passing said multi-layered confectionery product into a finishing apparatus.

2. The method of claim 1, further comprising sizing said multi-layered confectionery product after it has been extruded from said multi-layered extruder.

3. The method of claim 1, further comprising passing said multi-layered confectionery product through a cooling apparatus after it has been extruded from said multi-layered extruder.

4. The method of claim 1, further comprising adding a predetermined amount of sweeteners to a confectionery base to create at least said chewing gum composition.

5. The method of claim 1, wherein said finishing apparatus comprises a cut & wrap apparatus to form individually wrapped confectionery pieces.

6. The method of claim 1, wherein said extruding said multi-layered confectionery product from said multi-layered extruder includes simultaneously extruding said chewing gum composition and said candy composition in at least three adjacent layers from said multi-layered extruder.

7. The method of claim 1, wherein said chewing gum composition and said candy composition are processed within separate compartments of said multi-layered confectionery extruder prior to said extruding of said multi-layered product from said multi-layered extruder.

8. The method of claim 1, wherein said multi-layered confectionery product is extruded from said multi-layered extruder in the form of a multi-layered continuous rope.

* * * * *